(12) United States Patent
Park et al.

(10) Patent No.: US 7,692,758 B2
(45) Date of Patent: Apr. 6, 2010

(54) SPACER DISTRIBUTING APPARATUS FOR FABRICATING LIQUID CRYSTAL DISPLAY DEVICE

(75) Inventors: Chun Ok Park, Gyeongsangbuk-Do (KR); Sung Yel Kim, Gyeongsangnam-Do (KR)

(73) Assignee: LG Display Co., Ltd., Seoul (KR)

( * ) Notice: Subject to any disclaimer, the term of this patent is extended or adjusted under 35 U.S.C. 154(b) by 536 days.

(21) Appl. No.: 11/335,561

(22) Filed: Jan. 20, 2006

(65) Prior Publication Data

US 2006/0121817 A1    Jun. 8, 2006

Related U.S. Application Data

(63) Continuation of application No. 10/299,849, filed on Nov. 20, 2002, now Pat. No. 7,018,262.

(30) Foreign Application Priority Data

Nov. 24, 2001    (KR) ............................... 73601/2001

(51) Int. Cl.
  *G02F 1/1335*    (2006.01)
  *G02F 1/1339*    (2006.01)
(52) U.S. Cl. ....................... 349/187; 349/106; 349/155; 349/157; 118/306; 445/60; 445/66
(58) Field of Classification Search ......... 349/155–157, 349/106, 187; 118/308; 445/60, 66
See application file for complete search history.

(56) References Cited

U.S. PATENT DOCUMENTS

| | | | | |
|---|---|---|---|---|
| 4,265,350 | A * | 5/1981 | Vaughan ..................... | 192/95 |
| 4,839,529 | A * | 6/1989 | Fruengel .................... | 250/574 |
| 5,328,728 | A * | 7/1994 | Swirbel et al. ............. | 427/600 |
| 5,815,231 | A * | 9/1998 | Nishi et al. ................ | 349/151 |
| 5,854,663 | A * | 12/1998 | Oh et al. ...................... | 349/42 |
| 6,024,798 | A * | 2/2000 | Yamada et al. ............. | 118/679 |
| 6,109,816 | A * | 8/2000 | Iwasaki ...................... | 403/135 |
| 6,190,455 | B1 | 2/2001 | Doi et al. | |
| 6,485,370 | B1 * | 11/2002 | Kurosu et al. .............. | 464/180 |
| 6,749,816 | B1 * | 6/2004 | Hasegawa et al. .......... | 422/189 |
| 6,777,524 | B1 | 8/2004 | Shimizu et al. | |
| 2004/0048173 | A1 * | 3/2004 | Tutt et al. .................... | 430/22 |

FOREIGN PATENT DOCUMENTS

| KR | 96-38313 U | 12/1996 |
|---|---|---|
| KR | 10-0187423 B1 | 4/1999 |

* cited by examiner

*Primary Examiner*—Julie-Huyen L Ngo
(74) *Attorney, Agent, or Firm*—Birch, Stewart, Kolasch & Birch LLP

(57) ABSTRACT

A method of fabricating a liquid crystal display device includes forming a thin film transistor on a first substrate, forming a color filter on a second substrate, and forming a spacer on one of the first and second substrates, the spacer being formed by a distributing apparatus, and forming a liquid crystal layer between first and second substrates.

16 Claims, 5 Drawing Sheets

Reated Art

Reated Art

Reated Art

Reated Art

SPACER DISTRIBUTING APPARATUS FOR FABRICATING LIQUID CRYSTAL DISPLAY DEVICE

This application is a Continuation of application Ser. No. 10/299,849, filed on Nov. 20, 2002 now U.S. Pat. No. 7,018,262, the entire contents of which are hereby incorporated by reference and for which priority is claimed under 35 U.S.C. §120.

BACKGROUND OF THE INVENTION

1. Field of the Invention

The present invention relates to a spacer distributing apparatus used in fabricating a liquid crystal display device (hereinafter, as LCD) and particularly, to a distributing apparatus capable of preventing a spacer from being contaminated and adversely affecting the distribution of the spacer.

2. Description of the Related Art

Currently, the range of application of the liquid crystal display device is enlarged due to the rapid development of the liquid crystal display device and the liquid crystal display device is installed in most portable electronic devices due to its light weight. Accordingly, developing the manufacturing technology with a reduced cost and improved productivity is an essential criteria.

Generally, as shown in FIG. 1, a liquid crystal display apparatus includes an upper substrate 30 in which a color filter is formed, a lower substrate 10 in which a thin film transistor array is formed and a liquid crystal layer 22 which is disposed between the two substrates 10 and 30.

On the outer surface of the two substrates 10 and 30, polarizers 11 and 31, for linearly polarizing visible rays, are respectively attached. That is, the polarizer 31 is attached to a surface of the upper substrate 30 and a color filter 32 and a common electrode 33 are formed on the opposite surface where the polarizer is not attached. Also, a polarizer 11 is attached to a surface of the lower substrate 10. On the opposite surface where the polarizer is not attached, a TFT array, including a plurality of gate bus lines 12, a plurality of data bus lines 13, a switching device A, a pixel electrode 16 and the like is formed.

The TFT includes three electrodes including a gate, source and drain, an amorphous-Si for forming a conductive channel which has a current flow between the source electrode and drain electrode caused by an electric field when a positive voltage is applied to the gate electrode, and a passivation layer for protecting the device.

The LCD device with the above composition is formed by attaching the lower substrate which is composed of the TFT and the pixel electrode, and the upper substrate which is a color substrate having a liquid crystal disposed therebetween. An orientation film is formed on opposing surfaces through which the upper and lower substrates face each other, and a sealant is formed on the upper substrate. On the lower substrate, the spacer is formed and then the two substrates are attached.

FIG. 2 is a cross-sectional view showing an LCD device which is formed by attaching an upper substrate and a lower substrate.

On the opposing surfaces of the upper substrate 30 in which the color filter is formed, and a lower substrate 10 in which the TFT array is formed, an alignment layer 36 is printed. Also, the sealant 38 which is printed in a non-active region forms a gap between the two substrates, and prevents leakage of liquid crystal (not shown) which is injected between the two substrates. Also, circular spacer 40 is uniformly distributed between the two substrates so that the two substrates maintain a predetermined interval.

Also, to maintain a proper thickness of the liquid crystal layer in an LCD device, the spacer is distributed to control the gap between the two substrates, and prevent display spots and degradation of visuality, caused by a nonuniformity of the thickness of the liquid crystal layer.

Recently, the LCD device requires a high performance, such as a high contrast ratio, an expansion of the viewing angle field, and a high resolution that enables a uniform display without a display defection over the whole device. To insure high performance of the LCD device, it is necessary to control the interval between the substrates as a predetermined value, and to insure high resolution, it is necessary to control the interval between the substrates to be uniform in the whole device. Therefore, to improve display performance, it is very important that a spacer is uniformly distributed in the whole area of the substrate.

In the LCD device, as the spacer, 10 to 2000 particles having a uniform diameter of from several microns to several tens of microns are uniformly distributed or spread in 1 $mm^2$ as a single step to form an interval, so that the liquid crystal can be injected between the glass substrates or between plastic (organic glass) substrates, or between the plastic substrate and the glass substrate. As the spacer for the liquid crystal, various plastic particles or silica particles can be used.

Generally, as the method for distributing the spacer, there are the wet distribution method and the dry distribution method. The wet distribution method suspends the spacer for the liquid crystal in a solution such as Fron under a colloidal condition and uniformly distributes the resultant product on the substrate in a liquid state. Then, a predetermined amount of spacer is uniformly distributed on the substrate as a single step by vaporizing the solution. However, since the usage of Fron is limited due to environmental problems, the following dry distribution method is commonly used.

The dry distribution method is performed by distributing the spacer without, so-called lumps by charging it positively or negatively. As an example, when a high voltage is generated in an electrode at the end of the nozzle and the air at the circumference thereof is ionized, the spacer carried by the air collides with the negative ions in the air and is negatively ionized. The negatively ionized spacers are led to a substrate on the supporter which is grounded so that they repel each other. The spacers which are negatively ionized on the substrate are positioned at regular intervals by the repulsive force among each other.

FIG. 3 is a view showing an example of a general spacer distributing apparatus.

As shown in the drawing, in the spacer distributing apparatus for a liquid crystal, a stage or table 41 which is grounded, is positioned within the lower portion of a hermetically sealed chamber 40 and a substrate 51 which is a distributed material which is applied to the table is grounded so that the spacer which is a charged fine powder is precisely attached to the grounded substrate 51.

A nozzle unit 42 which freely moves in the left and right directions and front and rear directions on a flat panel is installed at the upper portion of the chamber 40. The nozzle unit 42 is connected to a spacer supply unit 43 by a SUS pipe 44 to discharge the spacer for the liquid crystal. The spacer is carried with an air stream of gas, such as air or nitrogen, from the spacer supply unit 43 to distribute the spacer on the substrate 51.

FIG. 4 is an enlarged view showing the nozzle unit 42. The nozzle unit 42 which is installed at the upper center portion of the chamber 40, includes a nozzle 46 which is composed of a hollow pipe, a supporter 45 for supporting the nozzle 46, a ball bearing 47 which is inserted between the nozzle 46 and supporter 45 so that the nozzle 46 can be freely moved in the left and right directions and front and rear directions, a driving unit (for instance, a motor) for driving the nozzle 46 in the multiplicity of directions, and a cover 49 which covers the nozzle 46.

The cover 49 is attached to prevent the introduction of foreign materials or dust into the inside of the chamber 40 between the nozzle 46 and the supporter 45 when the spacer is distributed to the substrate 51 as the nozzle 46 is moved in the left and right directions and the front and rear directions. The cover 49 is called a dust cover.

However, when the cover 49 is used for a long time, tearing of the cover 49 occurs in the connection between the nozzle 46 and cover 49 due to the frequent movement of the nozzle 46. Therefore, foreign materials can penetrate through the tearing crevice whereby the inside of the chamber 40 becomes polluted.

When the cover 49 becomes torn due to the continuous rotation of the nozzle 46, the spacer which was distributed and lumped in the torn part (A) falls onto the substrate, causing a serious defect in the surface of the LCD.

SUMMARY OF THE INVENTION

Therefore, an object of the present invention is to provide a spacer distributing apparatus, capable of preventing tearing of a cover to be uniformly positioned on a substrate without producing lumps of the spacer material, by constructing the structure of a dust cover to prevent the introduction of foreign materials into the nozzle unit. The dust cover has stepped configuration.

To achieve these and other advantages and in accordance with the purpose of the present invention, as embodied and broadly described herein, there is provided a spacer distributing apparatus for fabricating a liquid crystal display device, including a chamber, a table positioned inside the chamber, a spacer supply unit installed outside the chamber, a nozzle having a dust cover, the dust cover being installed at the upper portion of the chamber, and a SUS pipe connecting the nozzle unit with the spacer supply unit. The nozzle unit includes a nozzle supporter for supporting the nozzle and the dust cover, which has stepped configuration, is utilized to protect the nozzle unit.

The table is positioned in the lower portion inside the chamber. Also, the table is grounded so that the substrate disposed on the table is also grounded to precisely attach the spacer for the liquid crystal, which is a charged fine powder.

The spacer supply unit is installed outside the chamber and supplies the spacer to the nozzle unit.

In the method of supplying the spacer, a gas such as air or nitrogen is supplied from the outside to the spacer supply unit and the pressure inside the spacer supply unit is increased. Therefore, the spacer for the liquid crystal is carried with the air stream of the gas and is supplied to the nozzle unit through the SUS pipe. The spacer, which is supplied to the nozzle unit, is distributed on the substrate through the nozzle of the nozzle unit.

In the nozzle unit which is composed of the nozzle supporter, nozzle, bearing, and stepped cover, the supporter supports the nozzle and the bearing which is installed between the nozzle and the nozzle supporter enabling the nozzle to freely move in the X and Y directions. The movement of the nozzle is performed by the driving unit which is installed on the nozzle supporter.

The cover which is attached to the center of rotation of the nozzle prevents the introduction of foreign materials into the chamber and has stepped structure for flexibly coping with the rotation of the nozzle.

It is desirable that the spacer distributing apparatus, in accordance with the present invention, is applied to the dry distribution method but it can also be applied to the wet distribution method.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 5:
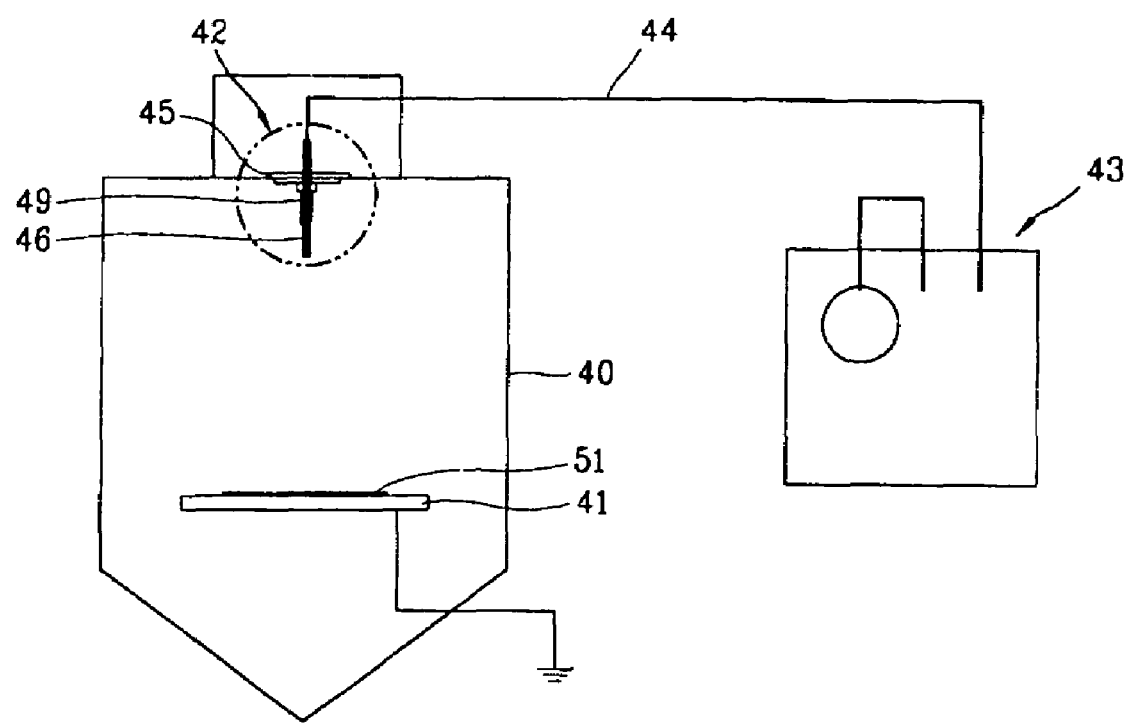
FIG. 5 is a schematic view showing a spacer distributing apparatus for fabricating a liquid crystal display device in accordance with the present invention.

FIG. 5 is a view showing a spacer distributing apparatus for fabricating a liquid crystal display device in accordance with the present invention.

As shown in the drawing, the spacer distributing apparatus for fabricating the liquid crystal display device in accordance with the present invention includes a chamber 40, a table 41 which is positioned inside the chamber 40, a spacer supply unit 43 for supplying the spacer to the chamber 40, a nozzle unit 42 which is installed in the upper portion of the chamber 40 for spraying the spacer which is supplied from the spacer supply unit 43 to the stage 41, and a SUS pipe 44 for connecting the spacer of the spacer supply unit 43 with the nozzle unit 42.

The nozzle unit 42 includes a nozzle 46, a nozzle supporter 45 for supporting the nozzle 46, and a dust cover 49 which covers the connection of the nozzle 46 and the nozzle supporter 45. The dust cover has a dual stepped structure which accommodates the shape of the nozzle 46 and the nozzle supporter 45.

The dust cover 49 prevents the inflow of dusts or foreign materials through the contact surface of the nozzle 46 and the nozzle supporter 45. Also, according to the frequent movement of the nozzle, the dust cover 49 is formed in a dual stepped structure along the shape of the nozzle 46 and the nozzle supporter 45 to prevent damage such as the tearing of the dust cover 49.

The table or stage 41 is grounded and positioned inside the lower portion of the chamber 40 and precisely attaches the spacer which is distributed through the nozzle 46 on a grounded substrate 51 by grounding the substrate 51 on the stage.

In the upper portion of the chamber 40, the nozzle unit 42 and the spacer supply unit 43, which can freely fluctuate in the left and right directions and the front and rear directions on a flat substrate, are connected to the SUS pipe 44, thus distributing the spacer on the substrate 51 by discharging the spacer, which is carried with a stream of gas such as air or nitrogen from the spacer supply unit 43, through the nozzle 46 of the nozzle unit 42.

The spacer supply unit 43 is provided outside and separate from the chamber 40 and supplies the spacer to the nozzle unit 42. By following the method for supplying the spacer, when the pressure inside the spacer supply unit 43 is increased due to the inflow of a gas, such as air or nitrogen, from the outside to the spacer supply unit 43, the spacer supply unit 43 supplies the spacer for the liquid crystal, which is carried with the air stream of gas, through the SUS pipe 44 connecting the spacer supply unit 43 and the nozzle unit 42, to the nozzle unit 42 and the nozzle 46 to be distributed on the substrate 51.

Figure 6A:
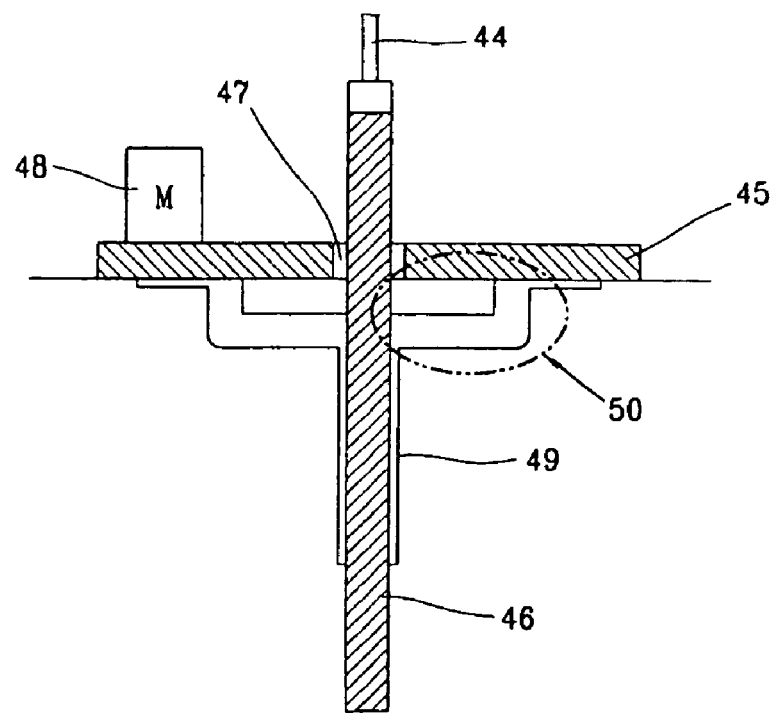
FIG. 6A is an enlarged view showing the nozzle unit of FIG. 5 according to first embodiment.
Figure 6B:
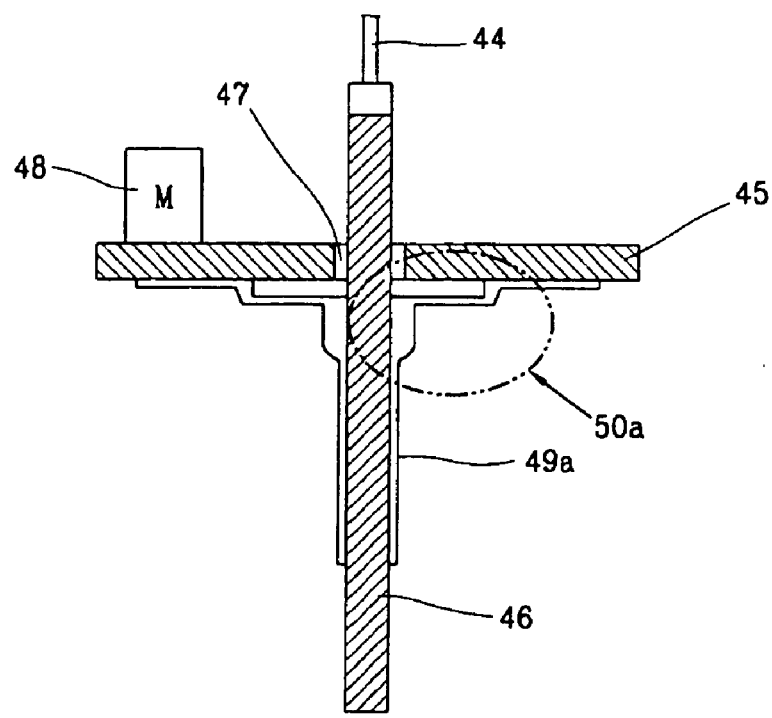
FIG. 6B is an enlarged view showing the nozzle unit of FIG. 5 according to second embodiment.

Hereinafter, the nozzle unit 42 including the nozzle 46, the nozzle supporter 45 and the dust cover 49 will be described with reference to FIGS. 6*a* and 6*b* showing in detail an enlarged view of the nozzle unit 42.

As shown in the FIG. 6*a*, the nozzle unit 42 includes the nozzle supporter 45, the nozzle 46 and the cover 49. A driving unit 48 for freely moving the nozzle 46 in the front and rear directions and in the left and right directions is positioned beside the nozzle unit 42.

The nozzle supporter 45 supports and fixes the nozzle 46 to the chamber and a bearing 47 is installed between the nozzle 46 and the nozzle supporter 45 so that the nozzle 46 can be freely moved in the front and rear directions and the left and right directions. The movement of the nozzle 46 is controlled by the driving unit 48 which is installed on the chamber 40.

The dust cover 49 which is attached to the nozzle 46 reduces the adverse effects caused by the collection of foreign material thereby minimizing the deformation of the shape caused by the movement of the nozzle 46. The dust cover is formed in a dual stepped structure 50 which flexibly copes with the rotation of the nozzle 46.

Figure 1:
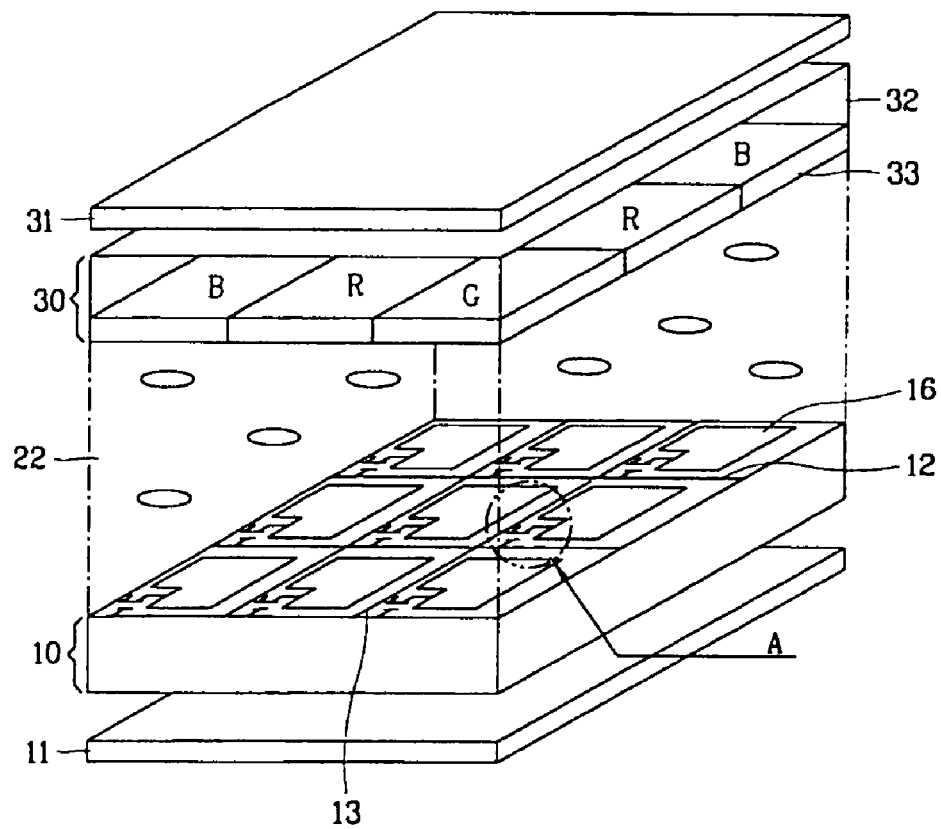
FIG. 1 is a schematic view showing a general liquid crystal display (hereinafter, as LCD) device.
Figure 2:
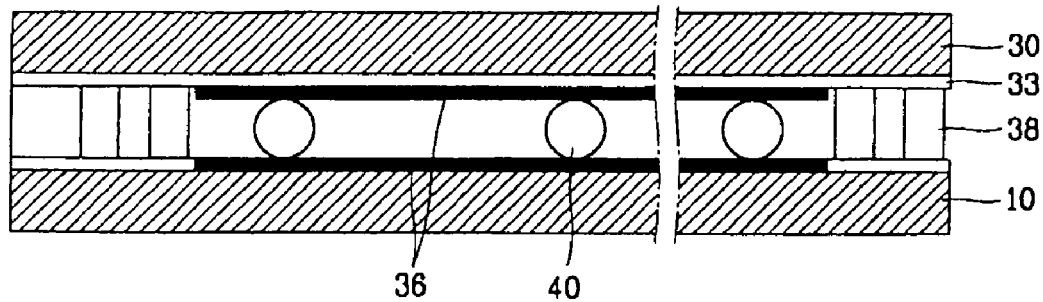
FIG. 2 is a cross-sectional view showing an LCD device which is formed utilizing an upper substrate and a lower substrate.
Figure 3:
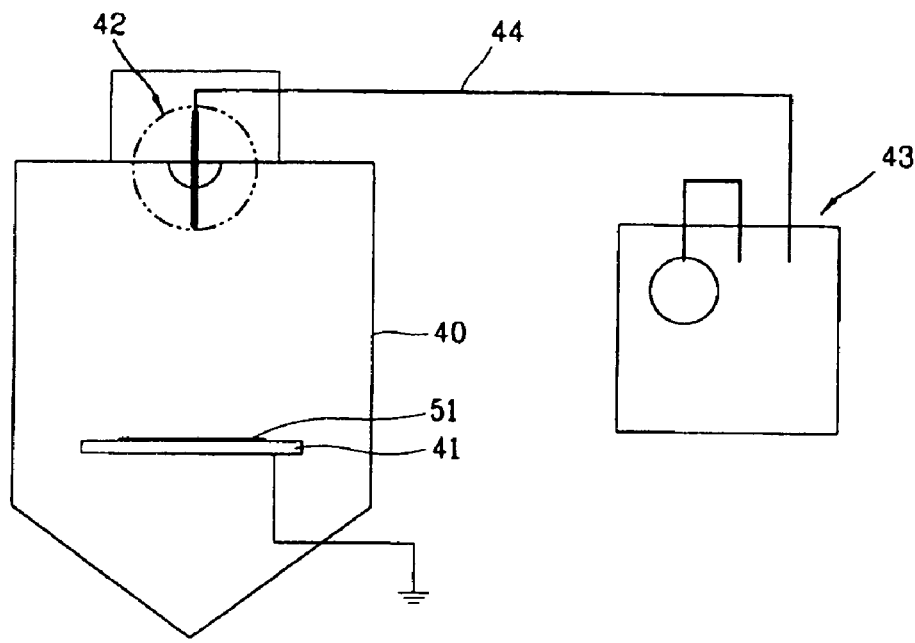
FIG. 3 is a schematic view showing a general spacer distributing apparatus.
Figure 4:
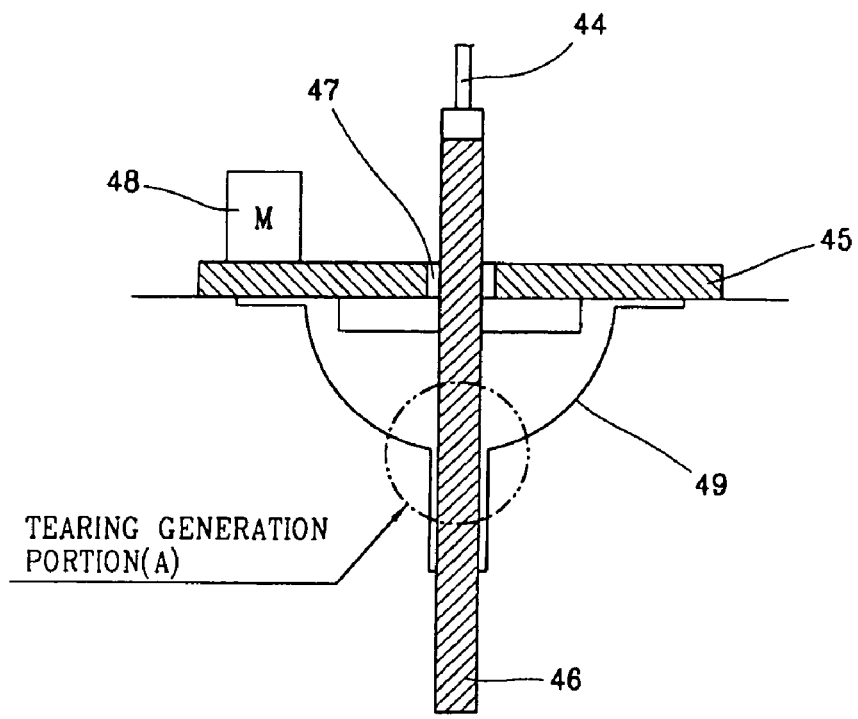
FIG. 4 is an enlarged view showing the nozzle unit of FIG. 3.

Generally, the nozzle 46 is moved in the left and right directions and in the front and rear directions to distribute spacer on the substrate. At this time, the foreign material collecting portion of the cover 49, as shown in FIG. 4, is torn by frequent movement of the nozzle 46. To prevent this, the cover 49 is formed as a dual stepped structure 50.

The cover 49 formed as above, prevents the inflow of foreign material into the chamber 40. Since it is made of rubber or a urethane material, free movement of the nozzle 46 can be flexibly accommodated and since it is formed as a dual stepped structure 50, the shape of the cover 49 is hardly changed, in spite of the fluctuations of the nozzle 46.

Therefore, since the cover 49 is not torn, even if the nozzle 46 is used for a long period of time, the conventional problems whereby foreign materials penetrate through the torn cover, are avoided. Also, a spacer which otherwise may collect around the torn cover and eventually fall on the substrate, can also be eliminated.

FIG. 6*b* shows a nozzle portion having a dust cover 49*a* which is formed in a triple stepped structure 50*a*. An identical reference numeral is given to the identical part as in the first embodiment (FIG. 6A), and different points will be described. As described above, in case the dust cover 49*a* is formed in the triple stepped structure 50*a*, it could not smoothly cope with frequent movement of the nozzle, compared with the dual stepped structure 50.

In the present invention, the structure of the dust cover is not limited as the dual or triple stepped structure. That is, the shape of the dust cover can be changed according to the shapes of the nozzle, supporter and the like, which are covered by the dust cover.

The distribution process of the spacer by the spacer distributing apparatus can be described as follows.

Firstly, the spacer which, is stored in the spacer supply unit 43, passes through the SUS pipe 44 to the nozzle 46 and is sprayed through the nozzle 46. At this time, the pressure of the gas, e.g., air or nitrogen, in the spacer supply unit 43 is increased and accordingly, the spacer which is carried with the stream of gas is supplied to the nozzle 46. When the spacer is supplied to the nozzle 46, the nozzle 46 evenly distributes the spacer onto the substrate 51 by moving in the front and rear/left and right directions, namely, X and Y directions, using the driving unit 48 which is installed in the upper potion of the chamber 40.

In the method of distributing the spacer on the substrate 51, either the stage on which the substrate is positioned is fixed and the nozzle 46 is moved, or the stage 41 on which the substrate 51 is positioned is moved and the nozzle 46 is fixed. Also, the nozzle 46 and the stage 41 can be simultaneously moved.

Figure 7:
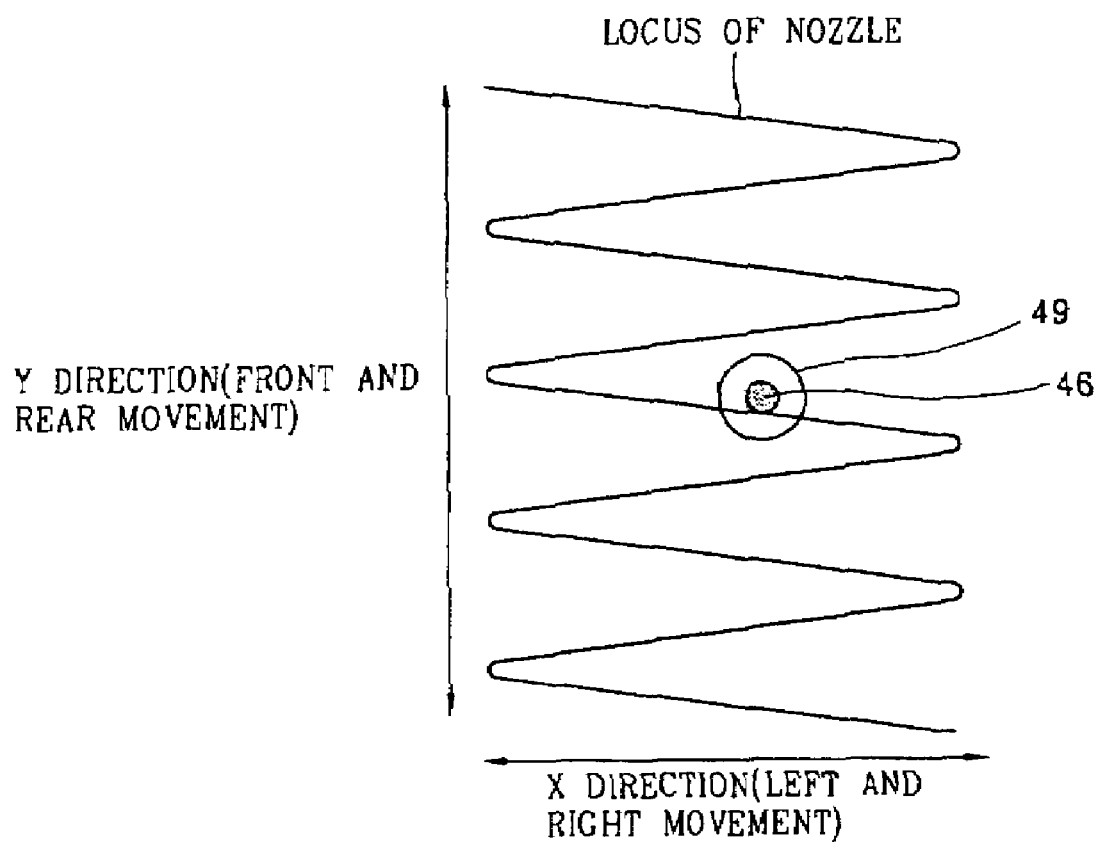
FIG. 7 is a view showing a scanning locus of the nozzle unit.

FIG. 7 is a pattern diagram showing a zigzag shape or serpentine configuration of the scanning locus of the spacer distributed on the substrate due to the movement of the nozzle 46 or the stage 41 in the left and right/front and rear directions. It can be seen that the scanning locus is the locus of the extension line of the center axis line of the nozzle 46 for distributing the spacer, and its intersection point on the substrate surface. The scanning locus is enabled by controlling the distributing of the spacer on the substrate 46 using the driving unit 48.

As the nozzle 46 moves in the X and Y directions, and the movements of the nozzle in the X and Y directions are synthesized, the spacer is distributed on the substrate 51 in the path shown in FIG. 7.

At this time, to prevent the introduction of foreign material into the chamber 40 and in the bearing 47 which is positioned at the rotation center of the nozzle 46, a cover 49, which is formed in stepped construction, is attached, in part, to the nozzle 46, and accordingly, there is no deformation of the shape of the cover 49 in spite of the free movement of the nozzle 46.

As described above, in accordance with the present invention, by reducing the radius of the foreign material collecting area and by forming a cover which is attached to the nozzle center portion of the nozzle, the spacer distributing apparatus for liquid crystal, which requires the free movement of the nozzle, can be effectively accommodated and the problem whereby the cover is torn by the movement of the nozzle, permitting the introduction of foreign material into the chamber, can be avoided.

Also, the defection in the distribution of the spacer on the substrate can be prevented by preventing the spacer from becoming lumped around the torn cover and falling onto the substrate as the nozzle moves.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of fabricating a liquid crystal display device, comprising:
   forming a thin film transistor on a first substrate;
   forming a color filter layer on a second substrate;
   forming a spacer on one of the first and second substrates, the spacer being formed by a distributing apparatus; and
   forming a liquid crystal layer between the first and second substrates,
   wherein the distributing apparatus includes a chamber, a table in the chamber, a nozzle supporter for the chamber, a nozzle unit having a nozzle to be supported by the nozzle supporter and extended into the chamber through the nozzle supporter, and a dust cover attached to the nozzle supporter and the nozzle to be formed to substantially correspond to the shape of the nozzle and the nozzle supporter, the dust cover being made of flexible material in the stepped structure,
   wherein the nozzle is free to move in front and rear/left and right directions so that the nozzle is moving on the substrate in zigzag,
   wherein the dust cover moves freely in the front/rear directions and the left/right direction in accordance with the movement of the nozzle.

2. The method of claim 1, wherein the table is positioned in the chamber accommodating one of the first and second substrates.

3. The method of claim 1, wherein the nozzle unit is operatively associated with the chamber above the table.

4. The method of claim 1, wherein the spacer supply unit is operatively connected to the nozzle unit.

5. The method of claim 1, wherein a bearing between the nozzle and the nozzle supporter.

6. The method of claim 1, wherein the dust cover has a multi-stepped structure.

7. The method of claim 1, wherein the dust cover has a dual-stepped structure.

8. The method of claim 1, wherein the dust cover has a triple-stepped structure.

9. The method of claim 1, wherein a driving unit is operatively connected to the nozzle.

10. The method of claim 1, wherein the dust cover is formed of one of a rubber material and a urethane material.

11. The method of claim 1, wherein a SUS pipe is connected to the spacer supply unit and the nozzle unit.

12. The method of claim 1, wherein the table is positioned in the lower portion of the chamber and is free to move in left and right directions and front and rear directions.

13. The method of claim 1, wherein the table is positioned in the lower portion of the chamber and is free to move all directions.

14. The method of claim 1, wherein the table is grounded to ground the one of the first and second substrates.

15. The method of claim 1, wherein the spacer that is stored in the spacer supply unit is supplied to the nozzle unit by providing a means for increasing the pressure inside the spacer supply unit.

16. The method of claim 15, wherein the means is provided for supplying gas to the spacer supply unit.

* * * * *